(12) United States Patent
Crouse

(10) Patent No.: US 6,656,552 B1
(45) Date of Patent: Dec. 2, 2003

(54) HOSES CONTAINING COPOLYMER BLENDS

(75) Inventor: Michael L. Crouse, Murray, KY (US)

(73) Assignee: Dana Corporation, Toledo, OH (US)

( * ) Notice: Subject to any disclaimer, the term of this patent is extended or adjusted under 35 U.S.C. 154(b) by 11 days.

(21) Appl. No.: 09/886,330

(22) Filed: Jun. 21, 2001

(51) Int. Cl.[7] .......................... B29D 22/00; B29D 23/00
(52) U.S. Cl. .................... 428/36.91; 138/125; 138/126; 138/133; 138/137; 138/141; 138/143; 428/36.2; 428/36.8; 428/441; 428/476.9; 428/508; 428/532
(58) Field of Search .................. 428/35.7, 36.2, 428/36.8, 36.91, 441, 476.9, 508, 532; 138/125, 126, 133, 137, 141, 143

(56) References Cited

U.S. PATENT DOCUMENTS

| | | | |
|---|---|---|---|
| 4,814,379 A | 3/1989 | Flood et al. | 525/66 |
| H818 H | 9/1990 | Wagensommer et al. | 525/333.9 |
| 5,206,301 A | 4/1993 | Hattori et al. | 525/314 |
| 5,539,052 A | 7/1996 | Shieh et al. | 525/92 R |
| 6,074,717 A | 6/2000 | Little et al. | 428/35.7 |
| 6,179,008 B1 * | 1/2001 | Kawazura et al. | 138/125 |

* cited by examiner

*Primary Examiner*—Sandra M. Nolan
(74) *Attorney, Agent, or Firm*—Rader, Fishman & Grauer PLLC

(57) ABSTRACT

A heat-resistant multi-layer hose is described. The hose includes inner and outer elastomeric layers, and an intermediate reinforcing layer. The inner and outer layers each include a substantial fraction of ethylene-octene copolymer, and may include one or more compatible polymers such as EPDM, chlorosulfonated polyethylene, and chlorinated polyethylene. The use of relatively large amounts of ethylene-octene copolymer results in improved high heat resistance.

19 Claims, 1 Drawing Sheet

HOSES CONTAINING COPOLYMER BLENDS

BACKGROUND OF THE INVENTION

1. Field of the Invention

This invention relates to flexible hoses, and more particularly, to flexible hoses used for conveying fluids in heating and cooling systems.

2. Discussion

Conventional multi-layer hoses used in heating and cooling systems typically include inner and outer elastomeric layers and an intermediate reinforcing layer. The inner layer or core tube defines a flexible flow path for transporting fluids (liquids or gases) from one point to another in the heating and cooling system, and the outer layer protects the hose from cuts, abrasions and other environmental hazards. The elastomeric layers are usually made of polymers such as styrene butadiene copolymer rubber, polychloroprene and ethylene-propylene-diene monomer rubber (EPDM rubber), which provide good flexibility, toughness, and fluid impermeability. The reinforcing layer, which prevents excessive expansion of the inner layer when the core fluid is under pressure, can be fabricated from knitted, braided, or spiral wound synthetic yarn, including nylon, rayon, or glass fibers.

One difficulty with conventional hoses used in heating and cooling systems is inadequate heat resistance. Although multi-layer hoses perform well at ambient temperatures, many fail prematurely when exposed to high temperatures—as found, for example, in the engine compartments of motor vehicles. Such failures often occur because prolonged exposure to high temperatures (e.g., about 165° C. or greater) affects the structure of the polymers that make up the elastomeric layers. The resulting heat-aged hose is less resilient and is prone to crack when flexed.

SUMMARY OF THE INVENTION

The present invention provides a flexible multi-layer hose exhibiting improved heat resistance when tested in accordance with ASTM D573-01. The hose includes an elastomeric inner layer or core tube, an intermediate reinforcing layer disposed around the inner layer, and an elastomeric outer layer or protective cover disposed around the reinforcing layer. The intermediate layer comprises a woven fiber, and the inner and outer layers each includes a cross-linked polymer blend. The polymer blend includes a substantial fraction of ethylene-octene copolymer, and optionally, one or more compatible polymers such as chlorosulfonated polyethylene, chlorinated polyethylene, and EPDM. The ethylene-octene copolymer comprises from about forty to about one hundred parts by weight of the polymer blend, and the compatible polymers comprise from about zero to about sixty parts by weight of the polymer blend. The inner and outer layers may have the same or different formulation, and may also contain one or more solid fillers and liquid extenders (i.e., plasticizers). Useful solid fillers include carbon black and calcium carbonate; useful plasticizers include paraffinic oils. The polymer blend is usually cross-linked using a curing agent and an activator, such as an organic peroxide and zinc oxide, respectively. The inner and outer layers may include various additives such as antioxidants.

BRIEF DESCRIPTION OF THE DRAWING

The drawing FIGURE is a perspective side view of a multi-layer hose (not to scale).

DETAILED DESCRIPTION OF THE EMBODIMENTS

Figure 1:
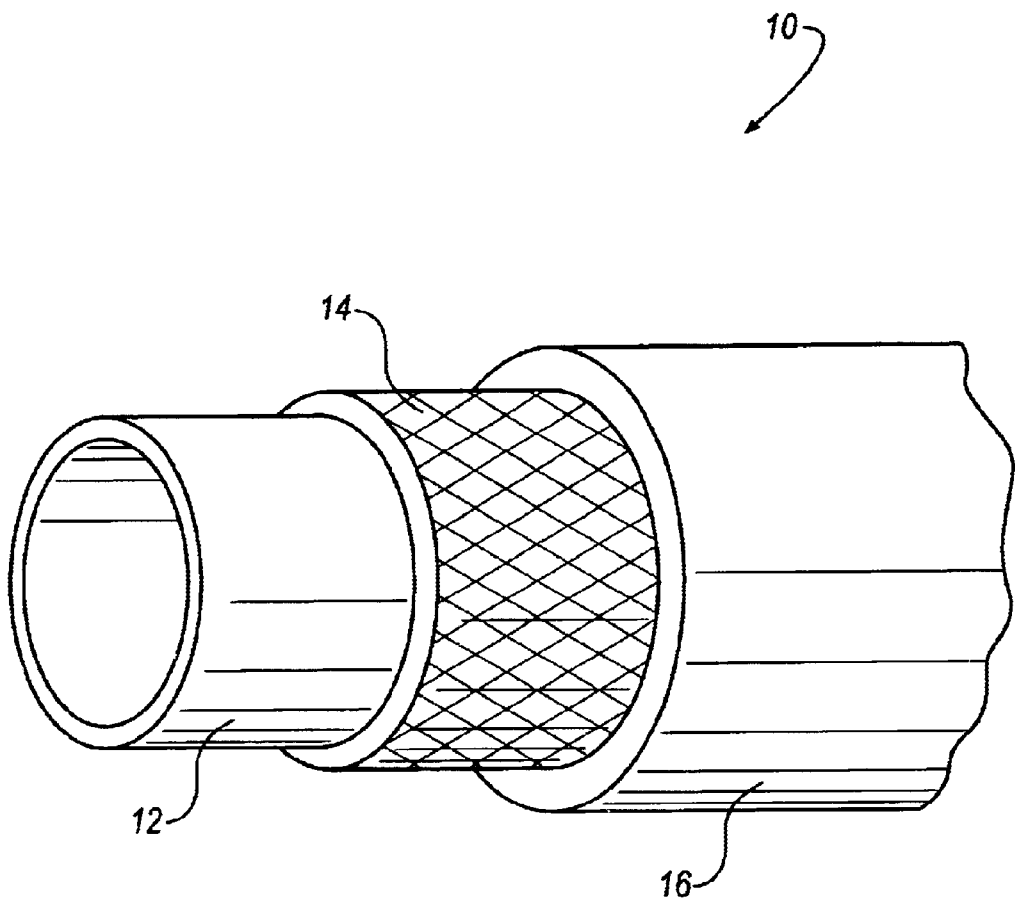

The FIGURE shows a perspective side view of one embodiment of a multi-layer hose 10 made in accordance with the present invention. The multi-layer hose 10 is composed of at least three layers: an inner layer 12 or core tube, an intermediate reinforcing layer 14, and an outer layer 16 or protective cover. The inner layer 12 defines a flexible and approximately cylindrical flow path for conveying fluids (liquids and gases) within heating and cooling systems of motor vehicles, residential buildings, industrial complexes, etc. The reinforcing layer 14, which prevents excessive expansion of the inner layer when the core fluid is under pressure, can be fabricated from knitted, braided, or spiral wound synthetic yarn, including nylon, rayon, or glass fibers. The outer layer 16 protects the hose from moisture intrusion, cuts, abrasions and other environmental hazards such as oils and solvents. For most applications, the core tube has an inner diameter of about ⅝ or 0.625 inch, and the cover has an outer diameter of about 0.79 inch. The resilient inner 12 and outer 16 layers each have a thickness that ranges from about 0.06 inch to about 0.10 inch. Other embodiments may include additional resilient barrier layers and reinforcing layers disposed between the inner 12 and outer 16 layers.

The inner 12 and outer 16 layers include a polyolefin elastomer, ethylene-octene copolymer, and optionally, one or more compatible polymers such as chlorosulfonated polyethylene, chlorinated polyethylene, and EPDM. To improve heat resistance while maintaining the requisite level of fluid impermeability, toughness, chemical inertness, and flexibility, the inner 12 and outer 16 layers include a substantial fraction of ethylene-octene copolymer. If the amount of any particular component in each layer 12, 16 is characterized as a fraction of the total mass of the polymer component—expressed as parts per hundred rubber or PHR—thylene-octene copolymer can comprise from about 40 PHR to about 100 PHR of the layers 12, 16. Each of the layers 12, 16 may also include from about 0 PHR to about 60 PHR of one or more of the compatible polymers.

Useful forms of ethylene-octene copolymer include those containing up to about 25 mol % octene and having densities ranging from about 0.79 g/ml to 1.0 g/ml. Ethylene-octene copolymers are available from numerous manufacturers, including DuPont Dow Elastomers under the trade name ENGAGE.

As mentioned above, each of the layers 12, 16 may also include one or more compatible polymers, including chlorosulfonated polyethylene, chlorinated polyethylene, and EPDM. Suitable EPDM polymers are available from DuPont Dow Elastomers under the trade name NORDEL, and from Exxon Chemical Co. under the trade name VISTALON. Useful chlorosulfonated polyethylene polymers and chlorinated polyethylene polymers are available from DuPont Dow Elastomers under the trade names HYPALON and TYRIN, respectively.

Ethylene-octene copolymer and any compatible polymers can be cured or cross-linked by heating the blend of polymers in the presence of a curing agent. Useful curing agents include organic peroxides such as dicumyl peroxide, benzoyl peroxide, and other diacyl and dialkyl peroxides and peroxyketals. Generally, the peroxide is dispersed on solid particles (e.g., calcium carbonate) to facilitate mixing. The amount of organic peroxide added to the polymer blend will depend on, among other things, the desired degree of cross-linking and the structure of the polymers. However, the organic peroxide usually comprises from about 4 PHR to about 10 PHR of the polymer blend for a 40-weight percent dispersion of organic peroxide on clay. Useful organic peroxides include dicumyl peroxide dispersed on calcium carbonate, which is available from Hercules, Inc. under the trade name DICUP. Other useful organic peroxides include 2,5-dimethyl-2,5-di(t-butoxyperoxy) hexane, which is available from R.T. Vanderbilt under the trade name VAROX, and 1,1-di-(tertbutylperoxy)-3,3,5-trimethylcylohexane, which is available from AkzoNobel under the trade name TRIGONOX. In other embodiments, the polymers can be cured by irradiating the layers 12, 16 with electron beam or γ radiation.

In addition to the curing agent, the layers 12, 16 may include activators, solid fillers, extenders, and antioxidants. Activators facilitate cross-linking and include zinc oxide, which may comprise from about 3 PHR to about 15 PHR of each of the layers 12, 16. Solid fillers, such as carbon black and calcium carbonate reinforce the polymer blend. Each of the layers 12, 16 may include from about 80 PHR to about 150 PHR carbon black and from about 10 PHR to about 50 PHR calcium carbonate. Extenders, such as paraffinic oils, can be used to soften the polymer blend and to improve processing and may comprise from about 30 PHR to about 80 PHR of each of the layers 12, 16. Antioxidants, such as secondary amines, phenolics, and phosphites, help prevent degradation of the polymer chains following cross-linking and may comprise up to about 8 PHR of the layers 12, 16.

To prepare the multi-layer hose 10, all of the components of the inner layer 12 or the outer layer 16, except for the curing agent, are charged to a mixer and blended at a temperature sufficient to ensure a fluid mixture. Once all of the components are consolidated, the curing agent is added to the mixture, and the resulting blend is supplied to an extruder. The inner layer 12 or core tube is formed by extruding the blend through an annular die. The inner layer 12 is then covered by the intermediate reinforcing layer 14, which is comprised of a knitted, braided, or spiral wound synthetic yarn. Next, the hose construction is introduced in a crosshead die of a second extruder, which applies the outer layer 16 on the reinforcing layer 14. The multi-layer hose 10 is then cured in an oven, such as an autoclave.

EXAMPLE

The following example is intended to be illustrative and non-limiting, and represents a specific embodiment of the present invention.

All of the components listed in Table 1 except for the peroxide curing agent were added to a Banbury mixer and were brought up to 121° C. for four minutes. Following consolidation of the components, the peroxide curing agent was added to the mixture, which was processed at 99° C. for two minutes following curative addition. After thoroughly dispersing the peroxide curing agent, the mixture was delivered to first and second extruders. At the first extruder, an inner layer 12 (the lo FIGURE) or core tube was formed by extruding the mixture through an annular die. Upon leaving the annular die, the inner layer 12 was covered by an intermediate reinforcing layer 14, which was comprised of NOMEX yarn. Next, the hose construction was introduced in a crosshead die of the second extruder, which applied an outer layer 16 on the reinforcing layer 14. The multi-layer hose 10 was then cured in an autoclave at 162° C. and 80 psi for about twenty to forty minutes.

TABLE 1

Hose Formulation

| Component | PHR | Wt. % | Trade Name | Supplier |
| --- | --- | --- | --- | --- |
| Ethylene-octene copolymer | 50 | 16.1 | ENGAGE-8180 | DuPont Dow Elastomers |
| EPDM | 50 | 16.1 | VISTALON-4600 | Exxon Chemical |
| Calcium carbonate | 25 | 8.1 | CALCIUM CARBONATE | HM Royal |
| Carbon Black | 115 | 37.1 | N-650 | Cabot |
| Paraffinic oil | 50 | 16.1 | SUNPAR | CP Hall |
| Antioxidants | 3 | 1.0 | VANOX ZMTI | RT Vanderbilt |
| Zinc oxide | 10 | 3.2 | ZINC OXIDE 100% ACTIVE | Harwick |
| Dicumyl peroxide | 7 | 2.3 | DICUP 40 K.E. | Hercules |

Table 2 lists physical properties of the hose made with ethylene-octene copolymer. For comparison purposes, Table 2 also lists physical properties of a similar hose made with EPDM rubber and no ethylene-octene copolymer. Samples of the hoses were tested in accordance with ASTM D2240-01 (durometer), ASTM D4120-01 (tensile strength and elongation), and ASTM D3767 (thickness). Hardness, tensile strength, elongation, and adhesion were measured at room temperature (20° C.–25° C.); compression set was measured at 150° C. following seventy hours compression. Mooney viscosity ($ML_{1+4}$ 121° C.) was measured following addition of the peroxide curing agent.

TABLE 2

Physical Properties

| Property | Example | EPDM Hose |
| --- | --- | --- |
| Shore A Hardness | 74 | 70 ± 5 |
| Tensile Strength | 8.7 MPa | 8.3 MPa |
| Elongation | 350% | 200% |
| Adhesion | 35 lbs/in$^2$ | 10 lbs/in$^2$ |
| Mooney Viscosity | 30 $ML_{1+4}$ 121° C. | N/A |
| Compression Set | 63% | 75% |
| Modulus at 100% Elongation | 5.59 MPa | N/A |
| Modulus at 200% Elongation | 5.7 MPa | 4.8 MPa |

Table 3 shows results of heat resistance testing, which was carried out in accordance with ASTM D573-01. The ASTM standard requires that the hose maintain certain physical properties within specified ranges of values following heat aging at 163° C. for 168 hours. As can be seen in Table 3, the hose containing ethylene-octene copolymer was able to satisfy the ASTM specification following heating aging at a significantly higher temperature—175° C.—which indicates a substantial improvement in heat resistance. For comparison purposes, a hose containing EPDM rubber, but no ethylene-octene copolymer, was heat aged at 175° C. for 168 hours and tested in accordance with ASTM D573-01. As shown in Table 3, the EPDM hose did not meet the ASTM specification.

TABLE 3

Heat Resistance of Hose Containing Ethylene-octene Copolymer

| Physical Property | ASTM D573-01 163° C. for 168 hours. | 163° C. for 168 hours. | 175° C. for 168 hours. | EPDM Hose 175° C. for 168 hours. |
| --- | --- | --- | --- | --- |
| Tensile Strength | −25% change max | +0.57% change | −4% change | −80% change |
| Elongation | −65% change max | −21% change | +11.6% change | −90% change |

TABLE 3-continued

Heat Resistance of Hose Containing Ethylene-octene Copolymer

| Physical Property | ASTM D573-01 163° C. for 168 hours. | 163° C. for 168 hours. | 175° C. for 168 hours. | EPDM Hose 175° C. for 168 hours. |
| --- | --- | --- | --- | --- |
| Shore A | 85 max (±10 points) | 10 point change | 7 point change | 10 point change |

It is to be understood that the above description is intended to be illustrative and not limiting. Many embodiments will be apparent to those of skill in the art upon reading the above description. Therefore, the scope of the invention should be determined, not with reference to the above description, but instead with reference to the appended claims, along with the full scope of equivalents to which such claims are entitled. The disclosures of all articles and references, including patent applications and publications are incorporated herein by reference for all purposes.

What is claimed is:

1. A hose comprising:
   an inner layer;
   an intermediate reinforcing layer disposed around the inner layer, the intermediate layer comprised of a woven fiber; and
   an outer layer disposed around the reinforcing layer;
   the inner and outer layers each comprising a polymer system, the polymer system being cross-linked and comprising from about forty to about one hundred PHR of ethylene-octene copolymer, and from about zero to about sixty PHR of one or more compatible polymers including chlorosulfonated polyethylene, chlorinated polyethylene, or EPDM.

2. The hose of claim 1, wherein the inner and outer layers have the same composition.

3. The hose of claim 1, wherein the inner and outer layers each includes from about four to about ten PHR of a curing agent.

4. The hose of claim 1, wherein the inner and outer layers each includes from about three to about fifteen PHR of an activator.

5. The hose of claim 1, wherein the inner and outer layers each includes from about ten to one hundred fifty PHR of a solid filler.

6. The hose of claim 1, wherein the inner and outer layers includes from about thirty to about eighty PHR of an extender.

7. The hose of claim 1, wherein the hose exhibits heat resistance at 175° C. when tested in accordance with ASTM D573-01.

8. A hose comprising:
   an inner layer;
   an intermediate reinforcing layer disposed around the inner layer, the intermediate layer comprised of a woven fiber; and
   an outer layer disposed around the reinforcing layer;
   the inner and outer layers each comprising a polymer system, the polymer system being cross-linked and comprising from about forty to about one hundred PHR of ethylene-octene copolymer, and from about zero to about sixty PHR of one or more compatible polymers including chlorosulfonated polyethylene, chlorinated polyethylene, or EPDM;
   wherein each of the inner and outer layers further includes a solid filler, an extender, a curing and an activator.

9. The hose of claim 8, wherein the inner and outer layers each includes from about ten to about one hundred and fifty PHR of the solid filler.

10. The hose of claim 8, wherein the inner and outer layers each includes from about thirty to about eighty PHR of the extender.

11. The hose of claim 8, wherein the inner and outer layers each includes from about four to about ten PHR of the curing agent.

12. The hose of claim 8, wherein the inner and outer layers each includes from about three to about fifteen PHR of the activator.

13. The hose of claim 8, wherein the solid filler comprises carbon black, calcium carbonate, or a combination thereof.

14. The hose of claim 8, wherein the extender comprises a paraffinic oil.

15. The hose of claim 8, wherein the curing agent comprises an organic peroxide.

16. The hose of claim 8, wherein the activator comprises zinc oxide.

17. The hose of claim 8, wherein the hose exhibits heat resistance at 175° C. when tested in accordance with ASTM D573-01.

18. A hose comprising:
   an inner layer;
   an intermediate reinforcing layer disposed around the inner layer, the intermediate layer comprised of a woven fiber; and
   an outer layer disposed around the reinforcing layer;
   the inner and outer layers each comprising a polymer system, the polymer system being cross-linked and comprising from about forty to about one hundred PHR of ethylene-octene copolymer, and from about zero to about sixty PHR of one or more compatible polymers including chlorosulfonated polyethylene, chlorinated polyethylene, or EPDM;
   wherein each of the inner and outer layers further includes from about ten to about one hundred and fifty PHR of a solid filler, from about thirty to about eighty PHR of an extender, from about four to about ten PHR of a curing agent, and from about three to about fifteen PHR of an activator.

19. The hose of claim 18, wherein the hose exhibits heat resistance at 175° C. when tested in accordance with ASTM D573-01.

* * * * *